United States Patent
Watson

[11] 3,937,586
[45] Feb. 10, 1976

[54] HYDRAULICALLY ACTUATED MACHINE TOOL

[76] Inventor: Sanders Chapman Watson, 1358 Roller Coaster Road, Tucson, Ariz. 85704

[22] Filed: Dec. 13, 1973

[21] Appl. No.: 424,328

[52] U.S. Cl. ............................................. 408/147
[51] Int. Cl.² ........................................ B23B 29/034
[58] Field of Search ........... 408/146, 150, 147, 159, 408/180; 90/11 A; 82/1.2, 71; 91/499

[56] References Cited
UNITED STATES PATENTS

| | | | |
|---|---|---|---|
| 3,213,717 | 10/1965 | Breuning | 408/154 |
| 3,422,705 | 1/1969 | Nahodil et al. | 408/147 |
| 3,514,223 | 5/1970 | Hare | 91/499 X |
| 3,614,250 | 10/1971 | Connolly et al. | 408/147 X |
| 3,710,659 | 1/1973 | Pagella et al. | 82/1.2 |

FOREIGN PATENTS OR APPLICATIONS

| | | | |
|---|---|---|---|
| 268,127 | 2/1970 | U.S.S.R. | 408/146 |
| 268,871 | 7/1970 | U.S.S.R. | 408/146 |

*Primary Examiner*—J. M. Meister
*Assistant Examiner*—W. R. Briggs
*Attorney, Agent, or Firm*—Cahill, Sutton & Thomas

[57] ABSTRACT

A rotating machine tool for hydraulically positioning a cutting tool mounting assembly lateral to the axis of rotation is disclosed. A collar circumscribing the axis of rotation and having an inclined annular downwardly directed recess is slidably mounted on the machine tool. A pair of diametrically opposed plungers ride within the inclined recess and are forced into reciprocal movement thereby. The reciprocating plungers pump hydraulic fluid from a reservoir within the machine tool into a pressure chamber. The pressure chamber is connected to a piston and cylinder assembly, which piston is positionally responsive to the pressure within the chamber. The movement of the piston is translated into lateral movement of the cutting tool via a spring biased mounting assembly. In operation, the rotation of the collar is restrained while the body of the machine tool rotates. The difference in rotation rate between the collar and the body causes the plungers within the body to ride upon the inclined annular recess and induces pumping of the hydraulic fluid. The hydraulic fluid is pumped into the pressure chamber and an increase in pressure therein causes the mounting assembly to be displaced. Actuation of a relief valve connected to the pressure chamber permits the mounting assembly to return to its initial position in response to the force exerted by the bias springs. The inclined annular recess may be mated with a mirror image positionable swash plate to provide selectively variable maximum vertical movement to the plungers to vary the rate of pumping. Hydraulically operated cutting tool attachments connectable to a hydraulic fluid takeoff on the assembly are also described.

11 Claims, 13 Drawing Figures

HYDRAULICALLY ACTUATED MACHINE TOOL

BACKGROUND OF THE INVENTION

1. Field of the Invention

The present invention relates to machine tools, and, more particularly, to hydraulic apparatus for laterally displacing a rotating cutting element.

2. Description of the Prior Art

Various machine tools can be found in the prior art for laterally positioning a rotating cutting element. One of the earliest devices included a gear operated sliding assembly. The rate of lateral movement of the sliding assembly was a function of the gear ratio. The gear ratio was generally not variable without dismantling the machine tool. The resultant lost time during gear changes wasted valuable machinists' time and increased the cost of the product being fabricated. In addition, machinists would at times use improper gear ratios in an effort to expedite the machining process. Such action tended to produce less than optimum quality work.

To overcome the lack of variability in gear drive mechanisms, electro-mechanical devices were developed. These devices are generally satisfactory in performance but generate other problems. They need external electrical power sources and appropriate electrical switching gear to transmit electrical power from the source to the rotating machine tool. Furthermore, the continual presence of metallic shavings and cutting oil presented a hazard as they might short circuit the electrical components.

Several hydraulically operated laterally displaceable machine tools have also been developed. U.S. Pat. No. 3,422,705 illustrates a machine tool for cutting internal annular recesses using an ancillary hydraulic pressure source to actuate a piston. Movement of the piston is translated through a link to effect lateral movement of a rotating cutting element. U.S. Pat. No. 3,526,159 teaches a hydraulically operated machine tool for laterally displacing a rotating cutting element. An external source provides hydraulic fluid under pressure to axially displace a piston. Lateral movement of the piston is translated through gears to rotate a threaded shaft. Rotation of the shaft causes longitudinal displacement of the shaft which acts upon an inclined plane to laterally displace the cutting element.

Both of the above described hydraulic tools cannot be easily used on any existing jig bores or milling machines as each requires an external source of pressurized hydraulic fluid. In addition, the requirement for shafts and pistons aligned with the axis of rotation of the tool necessarily limits their minimum length. Thus, for any given jib bores or milling machines the size of the work piece is severly limited.

It is therefore a primary object of the present invention to provide a self contained machine tool having a laterally displaceable cutting element.

Another object of the present invention is to provide a compact machine tool having a laterally displaceable cutting element.

Yet another object of the present invention is to provide a machine tool having selectively operated means for effecting infinitely variable lateral movement of a cutting element.

Still another object of the present invention is to provide a machine tool having manually operated means for controlling the surface finish effected by a cutting element.

A further object of the present invention is to provide a machine tool having a selectively variable rate of lateral movement of a cutting element.

A yet further object of the present invention is to provide a rotating machine tool with a vertically displaceable non-rotating annular member to reciprocate a pair of diametrically opposed hydraulic fluid pumps and to generate a hydraulic force for laterally displacing a cutting element.

A still further object of the present invention is to provide a guick return to the start position of a hydraulically positioned laterally displaceable cutting element in a machine tool.

It is also an object of the present invention to provide a hydraulically operated machine tool having a hydraulic fluid pressure takeoff to operate a hydraulic mechanism for varying the angular orientation of the cutting element.

It is also another object of the present invention to provide hydraulically operated attachments useable in conjunction with a hydraulic fluid pressure takeoff in a hydraulically operated machine tool.

These and other objects of the present invention will become apparent to those skilled in the art as the description thereof proceeds.

SUMMARY OF THE INVENTION

The present invention may be described as a rotating machine tool having self contained hydraulic means for positioning a rotating cutting element lateral to the axis of rotation. An arbor, extending upwardly from the main body of the machine tool, is secured within the chuck of a rigid spindle machine, or the like, to effect rotation of the main body. A sliding collar, having an inclined annular recess is attached to the main body concentric with the arbor. A pair of diametrically opposed spring biased plungers mounted within corresponding cylinders are in engagement with the recess. One of two input lines interconnects each cylinder to a common hydraulic fluid reservoir internal to the main body through respective check valves. One of two output lines connect each cylinder to a common pressure chamber. An output line from the chamber channels a flow of hydraulic fluid into the cylinder of a piston and cylinder assembly. The piston acts upon a spring biased slidable mounting assembly for the cutting element. The operation of the present invention may be summarized as follows. The machine tool is rotated by actuating the rigid spindle machine. By restraining the rotary motion of the slidable collar, the non-rotating inclined recess will cause reciprocal movement of the plungers as they ride within the recess resulting in a pumping action within each cylinder to force a flow of hydraulic fluid from the reservoir to the chamber. The pressure buildup within the chamber results in a corresponding movement of the piston to laterally displace the cutting tool mounting assembly. Actuation of a relief valve intermediate the chamber and the reservoir drops the pressure within the chamber and the mounting assembly is free to return under the force of the bias springs. To vary the amount by which the plungers are displaced per revolution of the machine tool, a positionable inclined swash plate may be located intermediate the inclined recess and the plungers.

BRIEF DESCRIPTION OF THE DRAWINGS

The present invention may be described with greater specificity and clarity with reference to the following drawings, in which:

FIG. 1 illustrates the present invention attached to a rigid spindle machine or the like.

DESCRIPTION OF THE PREFERRED EMBODIMENT

Figure 1:
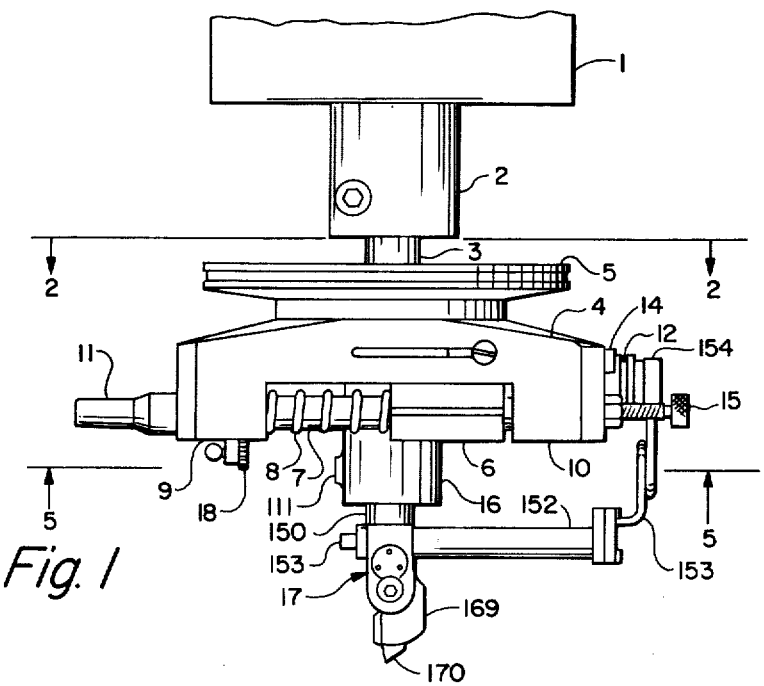

Referring to FIG. 1, there is shown a rigid spindle machine 1, or the like, having a rotatable receiver, or collet 2. The main body 4 of the present invention includes an upwardly extending arbor 3, which arbor is firmly secured within collet 2. A collar 5, rotatably mounted upon body 4, is essentially concentric with arbor 3. The lower part of body 4 includes a pair of downwardly extending supports 9 and 10. A pair of rods 7 are secured within supports 9 and 10 and extend across the recess intermediate the supports. A carriage 6 is slidably mounted upon the rods and biased in one direction by coil springs 8. A barrel 16, which may be formed as a part of carriage 6, extends downwardly from the carriage. Barrel 16 is essentially aligned with the center line of arbor 3 when carriage 6 has been positioned to the extreme right (as shown) under force of coil springs 8. An adjustment screw 15 may be incorporated to limit the movement of carriage 6 to the right. A cutting element or tool, generally identified by numeral 17, is rigidly secured within barrel 16. The movement of carriage 6 to the left may be limited by an adjustment screw, not shown, mounted within support 9. An axially retained disc 18 having a threaded aperture is turned to position the screw to the left or right. A housing 11 extending from support 9 encloses and protects the screw.

As will be described in further detail below, the positioning of carriage 6 is accomplished through a self contained hydraulic system disposed within body 4. An access cap 14 may be provided to permit access to a part of the hydraulic system. A fitting 12, normally capped by cap 13 (see FIG. 2), communicates with a hydraulic fluid pressure chamber interior to body 4 and includes a check valve to prevent loss of hydraulic fluid pressure therethrough. The fitting 12 can serve as a source of pressurized hydraulic fluid for an angularly displaceable hydraulically operated cutting tool 17.

Figure 2:
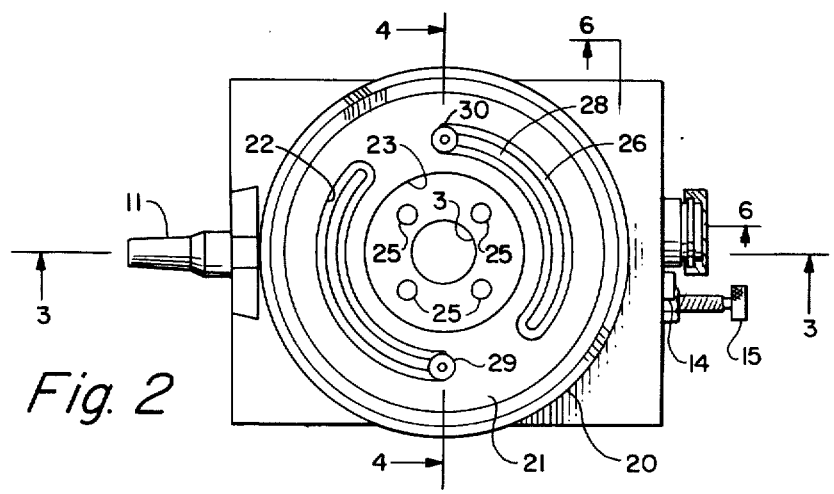
FIG. 2 illustrates a top view of the present invention taken along lines 2—2, as shown in FIG. 1.

The collar 5 is shown in further detail in FIG. 2. The periphery of collar 5 is formed by a vertically extending ridge 20 having a groove 19 (see FIG. 1) disposed therein. An aperture 23 is formed within planar base 21. Aperture 23 is internally shouldered to receive the radial flange 24 extending about arbor 3. A plurality of bolts 25 extend through flange 24 and secure the flange to body 4. A pair of arcuate apertures 22 and 26 are also disposed within base 21 concentric with aperture 23. A swash plate 28, visible through apertures 22 and 26, is selectively positionally retained adjacent the bottom of collar 5 by means of a pair of snubbing nuts 29 and 30 extending through apertures 22 and 26, respectively. By loosening the snubbing nuts, swash plate 28 may be rotated with respect to collar 5 to the extent of the arc defined by apertures 22 and 26.

Figure 3:
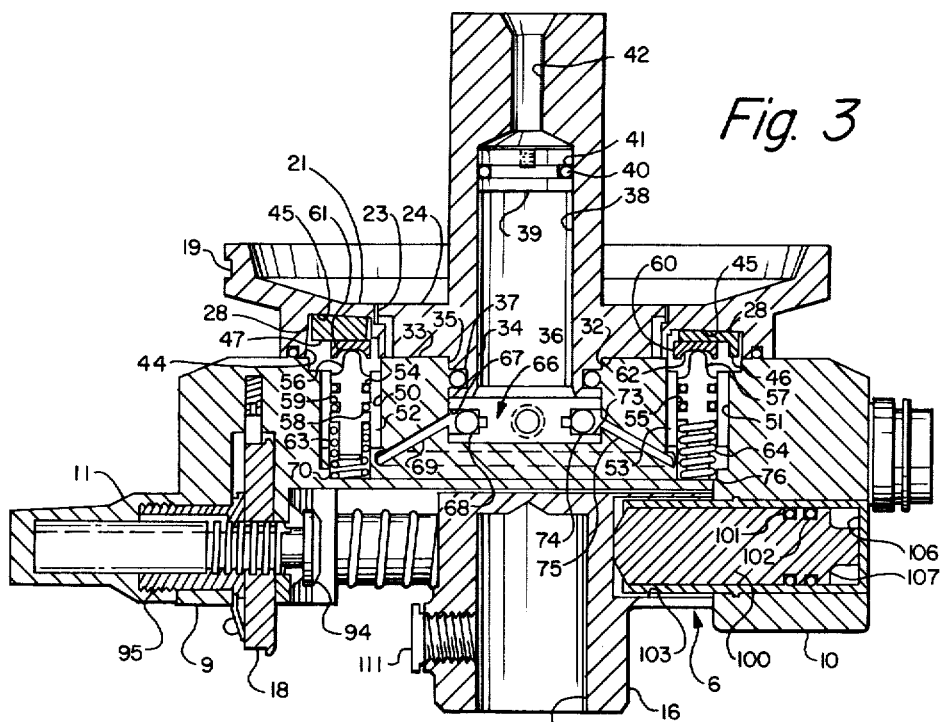
FIG. 3 illustrates a cross-sectional view of the present invention taken along lines 3—3, as shown in FIG. 2.

The mechanisms disposed within body 4 will be primarily described with reference to FIG. 3. The pepriphery of radial flange 24 is shouldered to mate with the shoulder of aperture 23. The relative dimensions are such that the lower surface 32 of collar 5 is adjacent to but not in frictional engagement with the upper surface 33 of body 4. A hollow stud 34 extends downwardly from flange 24 and fits within a downwardly extending circular cavity 35 formed within body 4. A seal intermediate stud 34 and cavity 35 is obtained by an O-ring 36 located within an annular recess 37 in the stud. A cylindrical cavity 38 extends upwardly from within stud 34 into arbor 3. A piston 39 is positioned within cavity 38. An O-ring 40 is located within an annular recess 41 in the piston 39 to provide a seal between the cavity and the piston. Thereby, the piston prevents communication between the cylindrical cavity 38 and the axial cavity 42 at the top of arbor 3.

A downwardly opening annular recess 44 is disposed within collar 5 concentric with aperture 23. The base 45 of recess 44 is inclined whereby the base defines a plane not normal to the axis of collar 5. The swash plate 28 is a ring slidably disposed within recess 44. The plane defined by the lower surface 47 of swash plate 28 is inclined with respect to the plane defined by the upper surface of the swash plate at the same angle as the base 45 of recess 44 is inclined with respect to a plane perpendicular to the axis of collar 5. The swash plate 28 may be milled to remove a portion of the lower surface to leave a shoulder 46 about the periphery of the swash plate.

From the above description, it may be understood that swash plate 28 is in the nature of a wedge when it is disposed within recess 44. In one position of the swash plate 28, the lower surface 47 is angled with respect to the axis of collar 5 by an amount equal to the sum of the angular displacement of base 45 and wedge angle formed by the swash plate. If the swash plate 28 is then rotated 180°, the angle formed by base 45 is complementary to the wedge angle formed by swash plate 28 whereby, the lower surface 47 of the swash plate is essentially normal to the axis of collar 5. The amount of rotational adjustment of swash plate 28 with respect to collar 5 is limited by the angle described by arcuate apertures 22 and 26 (see FIG. 2). It is also to be understood that the angles defined by the planes of the base 44 and the swash plate 28 may be identical to or different from one another.

Diametrically opposed cylindrical cavities 50 and 51 are disposed equidistant from the axis of rotation of body 4. Sleeves 52 and 53 are inserted within cavities 50 and 51, respectively. Plungers 54 and 55 are mounted within sleeves 52 and 53, respectively. These plungers include one or more O-ring 58 located within annular recesses 59 in the respective plungers to permit axial movement of each plunger within its respective sleeve and yet maintain a seal intermediate each plunger and its sleeve. Arcuate spherical radius ends 56, 57 extend upwardly from plungers 54 and 55, respectively. A non-rotating ring 60 lies adjacent lower surface 47 of swash plate 28. Spherical radius ends 56 and 57 engage recesses 61 and 62, respectively, formed within the ring.

As discussed above, the lower surface 47 of swash plate 28 may be either normal to the axis of collar 5 or may be at an angle therewith depending upon the angular positioning of the swash plate with respect to the collar. If the lower surface 47 is normal to the axis of collar 5, rotation of the swash plate, the latter sliding upon ring 60, will cause no axial displacement of the ring. However, if the angle defined by lower surface 47 is not normal to the axis of collar 5, one point of the lower surface of the swash plate will be higher above the upper surface 33 of body 4 than the diametrically opposed point on the swash plate.

Plungers 54 and 55 are upwardly biased by means of coil springs 63 and 64, respectively. Thus, plungers 54 and 55 will tend to exert an upward force upon ring 60 to maintain the latter in constant contact with lower surface 47 of swash plate 28. The ensuing rise and drop of ring 60 at a given point, such as plungers 54 and 55, when there is relative rotational movement between the swash plate and the ring, will cause the plungers to move upwardly and downwardly. The amount of upward and downward travel of plungers 54 and 55 is determined by the orientation of the swash plate as set by the snubbing nuts 29 and 30 (see FIG. 2). Thereby, the volumetric displacement of each of the plungers per revolution of collar 5 with respect to body 4 can be adjusted and set.

In the following description of the hydraulic system of the present invention, reference will be made jointly to FIGS. 3 and 7. A collar 66, which may be of nylon, is placed at the bottom of circular cavity 35. A ball check valve 68 is disposed within a radial passageway 67 extending through collar 66. A hydraulic line 69, which may be formed as an integral part of body 4, interconnects passageway 67 with a sump 70 at the base of cavity 50. Another hydraulic line 71 interconnects sump 70 with a pressure chamber 72. Both line 71 and chamber 72 may also be formed as integral parts of body 4. A second ball check valve 74 is disposed within another radial passageway 73 in collar 66. A line 75 interconnects passageway 73 with a sump 76 at the bottom of cavity 51. A further hydraulic line 77 interconnects sump 76 with chamber 72. Hydraulic lines 75 and 77 may also be formed integral with body 4.

From this description, it may be understood that the reciprocal action of plungers 54 and 55, biased by springs 63 and 64, respectfully, will generate cyclical pressure variations within the respective sumps to draw fluid through hydraulic lines 69 and 75 and pump the fluid into chamber 72. The ball check valves, of course, prevent return of the fluid through the passageways into the collar.

The central part of collar 66, in combination with cylindrical cavity 38, serves as a hydraulic fluid reservoir from which the fluid is pumped and to which it is returned.

Figure 4:
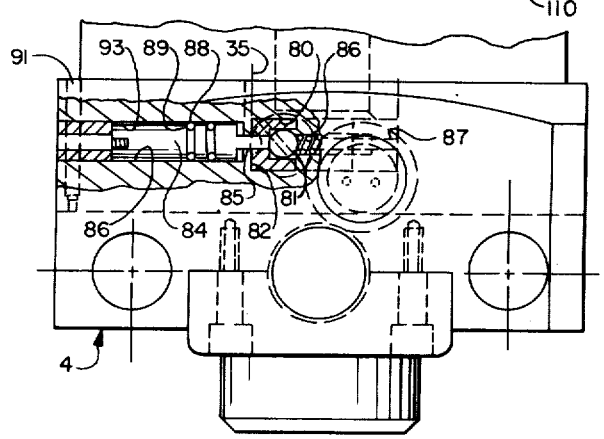
FIG. 4 illustrates a further cross-sectional view of the present invention taken along lines 4—4, as shown in FIG. 2.
Figure 7:
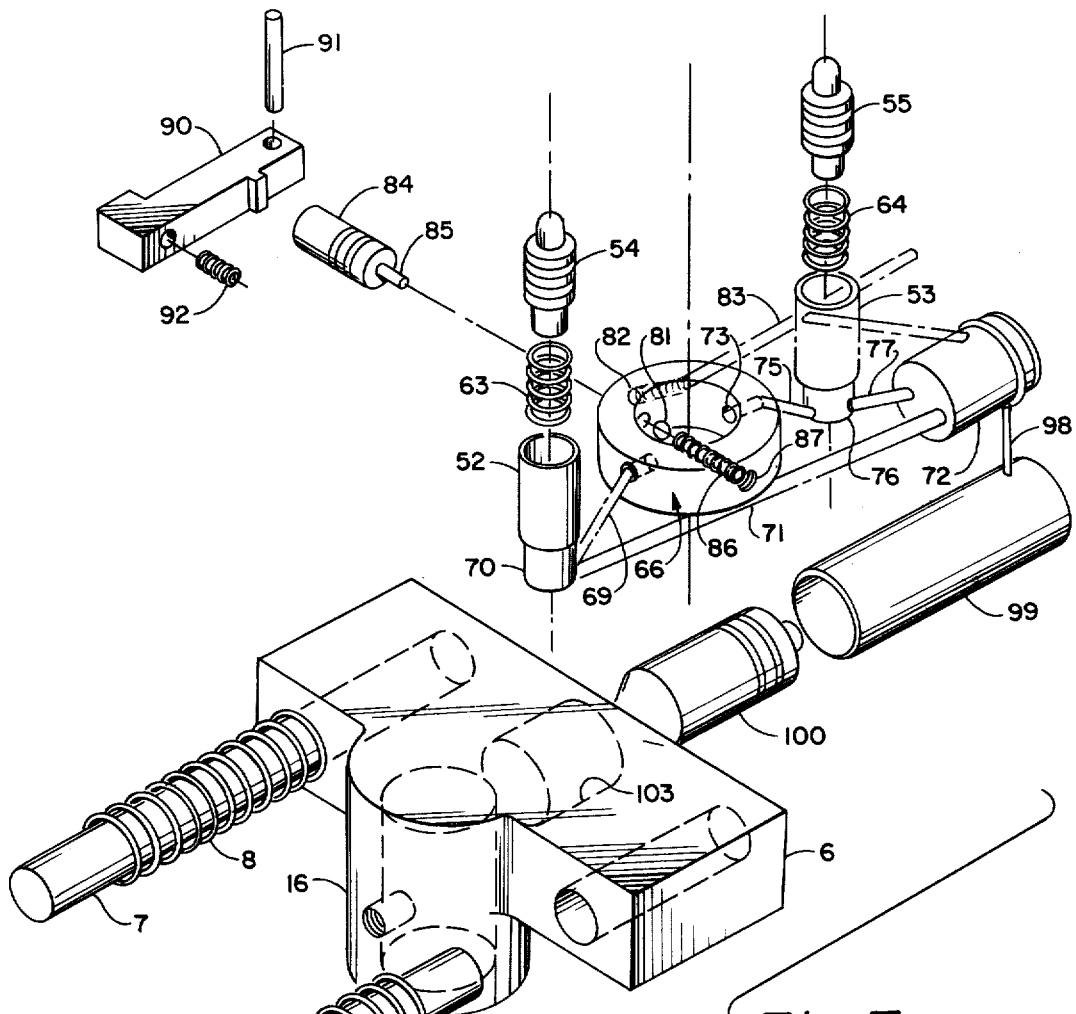
FIG. 7 illustrates an exploded view of the hydraulic system of the present invention.

Referring momentarily to FIGS. 4 and 7, the pressure relief within chamber 72 and the return of hydraulic fluid to the reservoir will be described. A hydraulic line 83, which may be formed integral with body 4, interconnects chamber 72 with a recess 82 formed in the external surface of collar 66 and defining a passageway in combination with the surface of cavity 35. A ball check valve 81 is disposed within a radial passageway 80, which passageway connects with recess 82. A plunger 84 is locaated within a cylindrical cavity 93 formed in body 4. A seal intermediate the plunger and the cavity may be established by one or more O-rings 88 mounted within annular recesses 89 in the plunger. The plunger 84 is aligned with passageway 80 and includes a tip 85 extending into the passageway to act upon the ball of ball check valve 81. A manually operated lever 90 is pivotally secured to body 4 by pin 91. Lever 90 contacts plunger 84, and when pushed toward body 4, axially displaces plunger 84 to unseat the ball in the ball check valve. A coil spring 92 may be incorporated to bias lever 90 away from body 4. It may therefore be understood that by the pressing lever 90, plunger 84 unseats the ball in ball check valve 81 and fluid, under pressure within chamber 72, will flow through hydraulic line 83, recess 82 and passageway 80 into the reservoir. The ball of the ball check valve may be biased by a coil spring 86 extending toward the ball from a diametrically opposed recess 87. Means may be incorporated to vary the bias provided by spring 86.

The apparatus and mechanism for moving carriage 6 will be described with reference to FIGS. 3, 5 and 7. Carriage 6 is journalled upon a pair of rods 7, which rods extend from and are secured within supports 9 and 10. A coil spring 8 about each of rods 7 biases carriage 6 toward support 10. The extent of movement of carriage 6 toward support 10 is essentially determined by adjustment screw 15 threadedly engaging support 10. The movement of carriage 6 toward support 9 is limited by a further adjustment screw 94. Adjustment screw 94 is housed within a sleeve 95, which sleeve is mounted within an aperture extending through support 9. The extension and retraction of screw 94 is controlled by disc 18 having a central threaded aperture engaging the threads of screw 94. The disc 18 is free to rotate within a slot in support 9 but is axially constrained to prevent any movement of the disc along the axis of screw 94. By rotating disc 18, screw 94 is axially displaced. The face of disc 18, if the threads of screw 94 are calibrated, may include indicia to indicate the extent of axial displacement of the screw. The stud of screw 94, is protected by a housing 11 threadedly engaging sleeve 95.

Referring particularly to FIG. 7, the movement of piston 100 in response to reciprocal action of plungers 54 and 55 will be described. As plungers 54 and 55 reciprocate in response to relative movement between collar 5 and body 4, hydraulic fluid is pumped into chamber 72. The fluid within chamber 72 is transported therefrom and into a sleeve 99 through a hydraulic line 98. The hydraulic line 98 may be formed as an integral part of body 4 to mate with an aperture in sleeve 99. The hydraulic fluid flows into sleeve 99 intermediate the sleeve base 106 and the rear surface 107 of a piston 100. The flow of hydraulic fluid into sleeve 99 will cause piston 100 to travel away from sleeve base 106. As the piston travels, the face 104 of the piston will exert a force against the bottom 105 of a cavity 103 disposed within carriage 6 and cause the carriage to move toward support 9. The movement of carriage 6 will be countered by the force exerted upon coil springs 8. Thereby, the movement of carriage 6 will be controlled and well defined.

Carriage 6 is returned adjacent the end of adjustment screw 15 by depressing lever 90 to release the pressure within chamber 72. The resulting loss of pressure within sleeve 99 acting upon piston 100, permits the carriage to return under force of coil springs 8.

Barrel 16 may include a cavity 110 to receive the shank of cutting tool 17. A set screw 111 engaging a threaded aperture retains the cutting tool shank within cavity 110.

Figure 6:
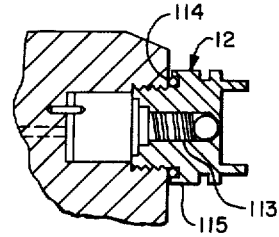
FIG. 6 illustrates a cross-sectional view of the pressure chamber of the present invention.
Figure 5:
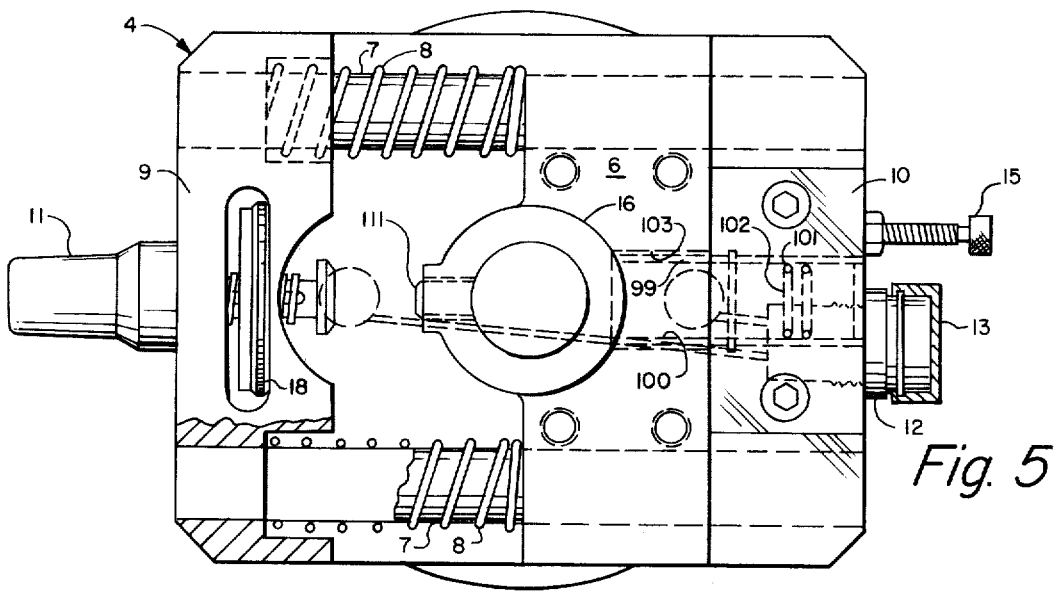
FIG. 5 illustrates a bottom view of the present invention taken along line 5—5, as shown in FIG. 1.

Referring to FIGS. 4, 5 and 6, the hydraulic fluid pressure takeoff fitting 12 will be described in further detail. In the preferred embodiment of the present invention, chamber 72 is formed as a cylindrical cavity within body 4. The cavity opening may be sealed, or fitting 12 may be threadedly secured to the cavity. Fitting 12 includes a ball check valve 113 to permit hydraulic fluid flow therethrough when the ball is unseated. An O-ring 114 is disposed intermediate body 4 and a recess within shoulder 115 to maintain and preserve the pressure within chamber 72. A further fitting, mating with fitting 12, may be used to convey hydraulic fluid under pressure to a further operating element used in conjunction with the present invention. In example, the cutting tool 17 may include a hydraulically actuated mechanism for effecting angular displacement of the cutting tool. In such case, a hydraulic line would be connected intermediate fitting 12 and the hydraulic mechanism of cutting tool 17. With such an arrangement, it is possible to obtain not only lateral displacement of cutting tool 17 but also concurrent angular displacement. Thus, a single cutting or milling operation may be carried out which previously required two operations.

Figure 8:
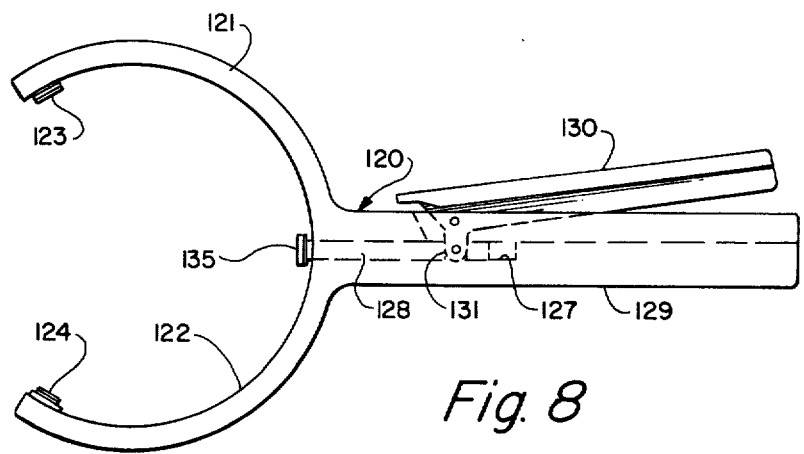
FIG. 8 illustrates a hand tool for retaining the collar of the present invention.

Referring to FIG. 8, there is shown a manually operated tool for gripping collar 5. When rigid spindle machine 1 is energized to rotate collet 2, arbor 3 will rotate and, as it is fixedly secured to body 4, the body will rotate. Unless rotation of collar 5 is restrained, the collar will rotate with the body. In this case, no pumping action will be effected by plungers 54 and 55 as there will be no upward and downward movement of ring 60. If rotation of collar 5 is restrained, the swash plate, if adjusted so that its lower surface 47 is non-perpendicular with the axis of rotation, will cause axial displacement of ring 60 and generate a pumping action by the plungers. The rotation of collar 5 can be restrained by manually gripping the collar. In the alternative and for safety reasons, it is desirable to employ a tool to grasp collar 5. The tool may be formed as a fork 120 having curved arms 121 and 122. At the extremity of each of these arms there is disposed a shoe 123 and 124, respectively. A trigger 130 is pivotally mounted within a slot 127 of handle 129 at pivot point 126. An arm 131 of trigger 130 pivotally engages a shaft 128. By pivoting trigger 130 about pivot point 126, the arcuate movement of arm 126 will cause axial displacement of shaft 128. Shaft 128 extends interior to arms 121 and 122. A further shoe 125 is secured to the extremity of shaft 128. Each of shoes 123, 124 and 125, are formed to engage groove 19 extending about the external surface of ridge 20 in collar 5. The curvature and extent of arms 121 and 122 are configured such that shoes 123 and 124 are beyond the center line of collar 5. By depressing trigger 130, shoe 125 will be forced toward shoes 123 and 124, which action will tend to squeeze groove 19 therebetween. The frictional engagement between shoes 123, 124, 125 and groove 19 will tend to restrain rotation of collar 5 despite continuing rotation of body 4. Thus, the tool shown in FIG. 8 may be employed to restrain rotation of collar 5.

Previously, the cutting element attachable to the present invention was generally identified by numeral 17 (see FIG. 1). As discussed earlier, the cutting element may be a simple blade having no movement independent of the movement generated by the main body 4. To increase the versatility of the present invention, an independently movable cutting tool 17 may be used. It is operated by the hydraulic pressure generated within chamber 72. The features and operation of this cutting tool will be described with joint reference to FIGS. 1, 3, 9 and 10.

Cavity 110 within barrel 16 is configured to receive holder 150 of cutting tool 17. A depression 151 within holder 150 is configured to receive the end of set screw 111. Thereby, cutting tool 17 is attached to carriage 6 of the present invention.

A casing 152 extends lateral to holder 150 and houses a hydraulically operated piston 155. Hydraulic fluid is conveyed into and out of casing 152 through a conduit 153. The conduit 153 is operably connected to the source of hydraulic pressure within chamber 72 by means of fitting 154 mating with fitting 12 after removal of dust cap 13 (see FIG. 2).

In the embodiment shown, conduit 153 is permanently secured to and extends through a cover plate 160 attached to the end of casing 152. An O-ring 161 may be disposed intermediate cover plate 160 and casing 152 to insure a sealed end for cylinder 156. Piston 155 is disposed within cylinder 156 and may include one or more O-rings 157 to form a seal against the wall of the cylinder. The piston is biased toward cover plate 160 by means of coil spring 158 disposed within cylinder 156. An annular step 159 may be formed within the lower end of the skirt of piston 155 to position the coil spring axially within the cylinder. A rack 162 extends from piston 155 and is axially positionable in conformance with movement of the piston.

As rack 162 is axially repositioned, the teeth 164 disposed therein engage an idler gear 163 mounted upon shaft 167 and cause the idler gear to rotate. A tool actuating gear 165 mounted upon a shaft 168 is in mesh with idler gear 163. The tool actuating fear 165 is non-rotatably secured to a housing 169 such that any rotary movement of the tool actuating gear will cause an equal and corresponding movement of the housing. A cutting element 170 is mounted within housing 169 and secured thereto by means of a set screw 171.

One end of a restraining spring 166 is in engagement with the main body of cutting tool 17. The other end of restraining spring 166 acts upon a stop 172 extending from housing 169. Restraining spring 166 is biased to counter rotational movement of housing 169 caused by tool actuating gear 165.

A dust cap 173 may be attached to the main body of cutting tool 17 by a bolt 175. The dust cap 173 protects the end of rack 162 when the latter is extended from within the main body of the cutting tool through aperture 176. A limit screw 174 may threadedly engage dust cap 173 to limit the movement of rack 162.

The operation of hydraulically actuated cutting tool 17 may be described as follows. When a pressure buildup occurs within pressure chamber 72, hydraulic fluid will be forced through fitting 154 and conduit 153 into the space intermediate the top of piston 155 and cover plate 160. The increasing volume of hydraulic fluid adjacent the piston within casing 152 will cause the piston to be displaced within cylinder 156. Displacement of piston 155 will cause a commensurate displacement of rack 162 resulting in rotational movement of idler gear 163. Idler gear 163, being in mesh with tool actuating gear 165, will cause housing 169 and attached cutting element 170 to be angularly repositioned with respect to the axis of holder 150. As the angular displacement of housing 169 is a direct function of the amount of travel of rack 162, the maximum angular displacement of the housing may be limited by limit screw 174, which limit screw limits the maximum movement of the rack.

Figure 13:
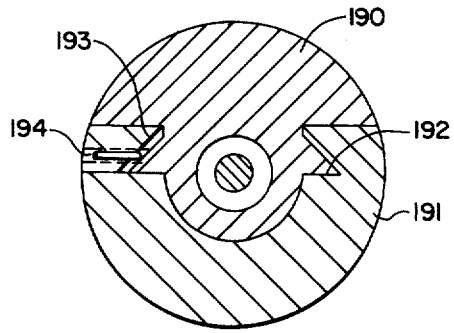
FIG. 13 illustrates a cross-sectional view of the cutting tool shown in FIG. 12, taken along lines 13—13.

A further independently positionable cutting tool 185 attachable to main body 4 of the present invention will be described with reference to FIG. 11, 12 and 13. Cutting tool 185 includes a mount assembly 186 attachable directly to carriage 6 by plate 184 and bolts 187. The body 188 of cutting tool 185 is pivotally connected to mount assembly 186 by means of a bolt 189.

Body 188 is formed of two primary members, a base frame 190 and a movable carriage 191. The base frame 190 is pivotally connected to the mount assembly 186. It may include indicia on the outer surface thereof representative of its angular position with respect to the axis of the arbor 8 (see FIG. 1). The movable carriage 191 is in slidable engagement with the base frame by means of a dove tail interface generally identified by numeral 192. An adjustable strip or gib 193 is employed to obtain a proper fit at the dove tail interface 192. A plurality of adjustment screws 194 extend into a base frame 190 to act against gib 193 to properly position the latter. Thereby, the play between the base frame and the movable carriage is maintained at a minimum.

Figure 11:
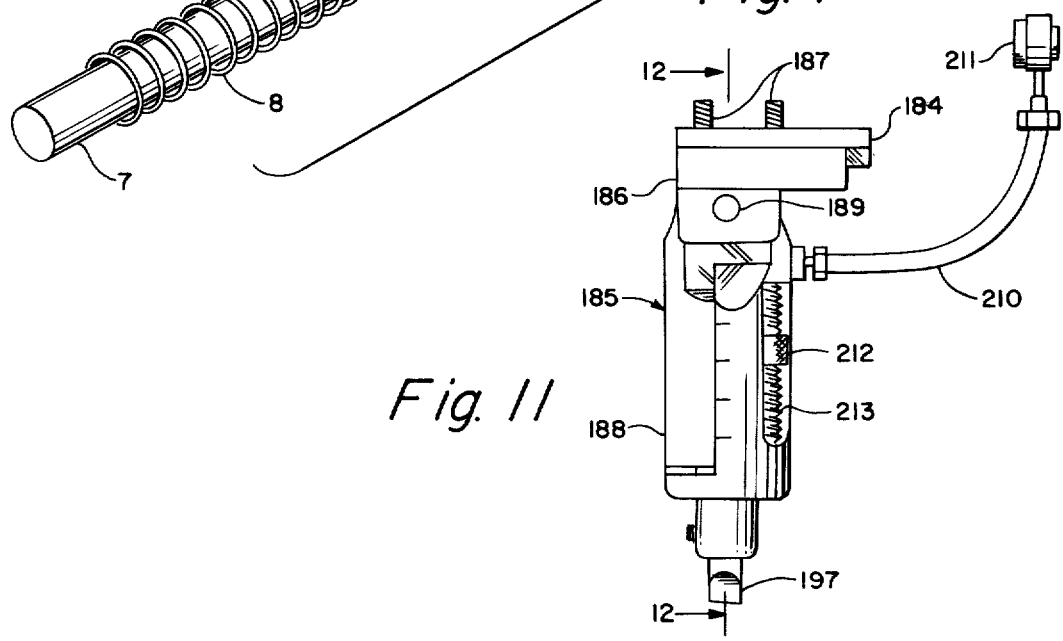
FIG. 11 depicts a further hydraulically operated cutting tool useable with the present invention.
Figure 12:
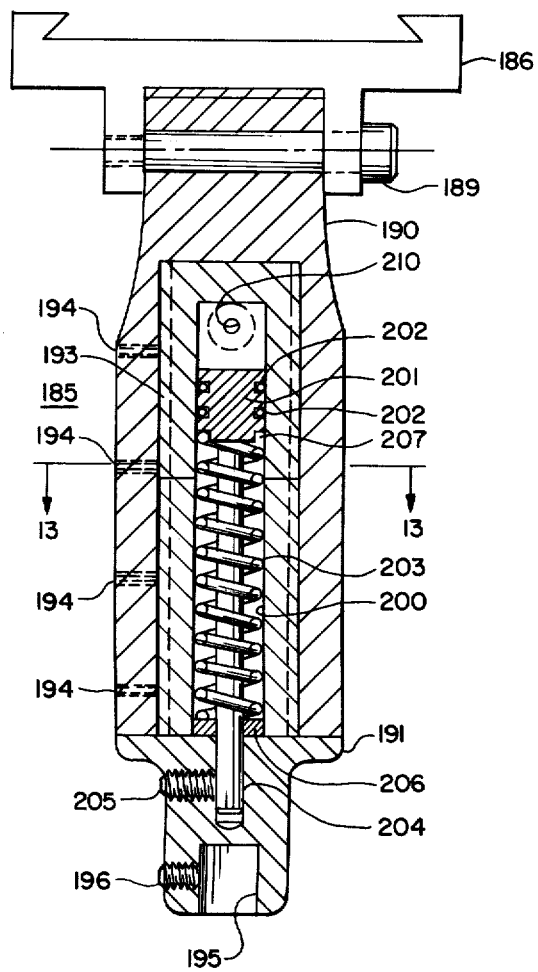
FIG. 12 illustrates a cross-sectional view of the further cutting tool shown in FIG. 11, taken along lines 12—12.

The movable carriage 191 includes a cavity 195 for receiving the cutting implement 197 (see FIG. 11). A set screw 196 retains the cutting implement 197 in place.

An axially oriented cylinder 200 is disposed within base frame 190. A piston 201 is slidably positioned within cylinder 200 and may include one or more peripherally mounted O-rings 202 to effect a seal intermediate the piston and the cylinder. A piston rod 204 extends downwardly from piston 201 and is secured within a cavity in the lower part of movable carriage 191 by means of a set screw 205. A coil spring 203 is disposed within the cylinder to bias piston 201 in the illustrated upward direction. The lower skirt of piston 201 may include an annular step 207 to receive one end of coil spring 203. The illustrated lower end of cavity 200 may include an apertured cap 206 to restrain downward movement of coil spring 203 and guide the piston rod 204 extending therethrough.

Hydraulic fluid is introduced within cylinder 200 adjacent the top of piston 201 by means of a conduit 210 attached to base frame 190. Conduit 210 terminates in a fitting 211, which fitting mates with and is attachable to fitting 12 extending from main body 4 (see FIG. 1).

The periphery of the base frame 190 and the movable carriage 191 at the junction therebetween (see FIG. 11) includes indicia indicative axial movement of the movable carriage with respect to the base frame. The movement of the movable carriage can be limited by means of a thumb screw 212 engaging a worm gear 213.

In operation, the angular orientation of cutting tool 185 with respect to the arbor 3 is set by loosening bolt 189, pivoting the cutting tool and retightening the bolt. When a hydraulic fluid pressure buildup occurs within chamber 72, hydraulic fluid will flow through fitting 12, fitting 211, conduit 210 and into the cylinder 200 adjacent the top surface of piston 210. The flow of hydraulic fluid will force a downward movement of piston 210, which downward movement is translated by piston rod 204 into a movement of a movable carriage 191. Thereby, the cutting implement 197 will be axially displaced in proportion to the pressure buildup within chamber 72.

Figure 9:
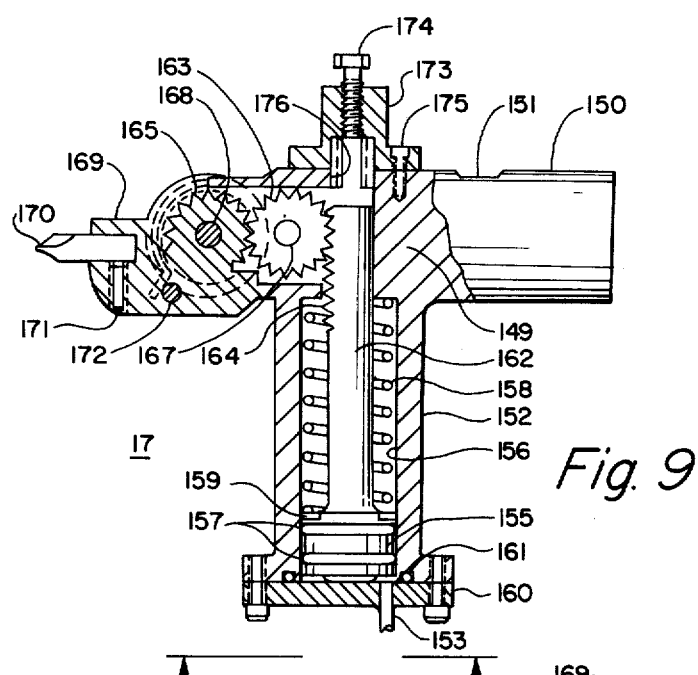
FIG. 9 depicts a hydraulically operated cutting tool useable with the present invention.
Figure 10:
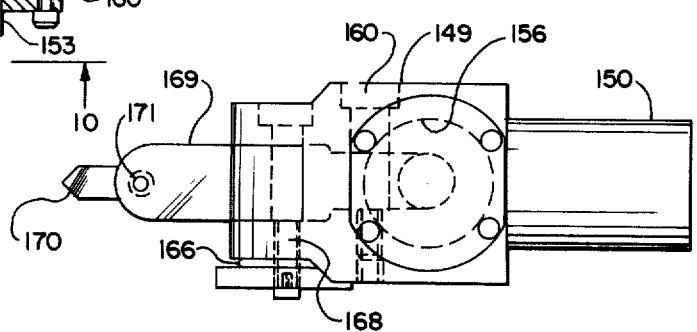
FIG. 10 illustrates an end view of the cutting tool shown in FIG. 9, taken along lines 10—10.

As will be obvious to those skilled in the art, the cutting tool illustrated in FIG. 9 provides a means by which the cutting implement may be angularly positioned while the pivot point of the cutting implement is laterally and vertically repositioned. Similarly, the cutting tool illustrated in FIG. 11 permits the cutting implement to be displaced along its axis simultaneously with vertical and lateral repositioning of the cutting implement. Thereby, these cutting tools provide a range of cutting configurations never before realized in the machine tool art.

While the principles of the invention have now been made clear in an illustrative embodiment, there will be immediately obvious to those skilled in the art many modifications of structure, arrangement, proportions, the elements, material, and components, used in the practice of the invention which are particularly adapted for specific environments and operating requirements without departing from those principles.

I claim:

1. A hydraulically operated machine tool attachable to and supported solely by a rigid spindle machine for laterally displacing a cutting element at a predetermined rate commensurate with the rate of rotation of the rigid spindle machine; said machine tool comprising in combination:
   a. a main body, said main body including an arbor extending therefrom for engagement with the collet of the rigid spindle machine to support said main body in relationship to a work piece;
   b. A reservoir of hydraulic fluid disposed within said main body;
   c. reciprocating means responsive to rotation of said main body and disposed within said main body for pumping the hydraulic fluid from said reservoir, said reciprocating means including:
      i. a plunger and a further plunger disposed within a cylindrical cavity and a further cylindrical cavity, respectively, in said main body;
      ii. a first passageway and a third passageway extending from said reservoir to said cylindrical cavity and to said further cylindrical cavity, respectively;
      iii. a second passageway and a fourth passageway extending from said reservoir to said pressure chamber; and
      iv. a check valve disposed within said first passageway to limit the flow of hydraulic fluid therethrough in one direction and a further check valve disposed within said third passageway to limit the flow of hydraulic fluid therethrough in one direction;

d. selectively actuatable means disposed within said main body for controlling the length of the stroke of said reciprocating means to selectively vary the volume of hydraulic fluid pumped per revolution of said main body, said controlling means including:
  i. a swash plate for axially displacing said plunger;
  ii. means for restraining the rotational movement of said swash plate induced by said main body; and
  iii. said swash plate being of a non-uniform thickness; whereby, said swash plate induces reciprocating axial movement of said plunger in response to relative movement of said swash plate and said plunger;

e. a pressure chamber disposed within said main body for receiving the hydraulic fluid pumped by said reciprocating means, including a pressure relief conduit for venting the hydraulic fluid back to said reservoir;

f. a movable carriage slidably attached to said main body, said carriage being positionable lateral to the axis of said arbor in response to the volume of hydraulic fluid received by said pressure chamber; and g. means for attaching the cutting element to said carriage; whereby, said machine tool is self contained by including all operative elements necessary to rotate the cutting element at the rate of rotation of the rigid spindle machine while simultaneously selectively displacing the cutting element laterally at a rate determined by said controlling means.

2. The machine tool as set forth in claim 1 wherein each of said plungers are diametrically opposed to one another and equidistant from the longitudinal axis of said arbor.

3. The machine tool as set forth in claim 2 wherein said swash plate is concentric with the longitudinal axis of said arbor, said swash plate overlapping at least a part of each of said plungers.

4. The machine tool as set forth in claim 3 wherein said swash plate includes a first planar surface normal to the longitudinal axis of said arbor and a second planar surface not normal to the longitudinal axis of said arbor.

5. The machine tool as set forth in claim 4 including:
  A. a collar rotatably mounted upon said main body concentric with said arbor;
  B. a circular channel disposed within said collar, said circular channel being concentric with said arbor; and
  C. means for positioning and retaining said swash plate within said circular channel; whereby rotational restraint of said collar induces reciprocal motion of said plungers.

6. The machine tool as set forth in claim 5 wherein the base of said circular channel defines a plane not normal to the longitudinal axis of said arbor, said plane defining an angle equal to the angle defined by said second planar surface with respect to the longitudinal axis of said arbor; whereby, the axial movement of said plungers induced by said swash plate can be varied by varying the relative position of said swash plate within said channel.

7. The machine tool as set forth in claim 6 including a ring disposed intermediate said swash plate and each of said plungers, said ring including means for mating with said plungers whereby said ring rotates with said main body.

8. The machine tool as set forth in claim 1 wherein said movable carriage comprises:
  A. a hydraulically actuated piston and cylinder assembly;
  B. a conduit extending from said pressure chamber to said piston and cylinder assembly for conveying hydraulic fluid into the cylinder to displace the piston;
  C. a carriage mounted upon a rail, said rail being a part of said main body;
  D. means for biasing said carriage in a first direction; and
  E. means disposed within said carriage for displacing said carriage in a second direction in response to a flow of hydraulic fluid through said conduit; whereby, said carriage is laterally displaced from the longitudinal axis of said arbor in response to reciprocal movement of said plungers.

9. The machine tool as set forth in claim 8 including:
  A. a further passageway extending from said pressure chamber to said reservoir; and
  B. valve means disposed within said further passageway for releasing the pressure within said pressure chamber; whereby, the hydraulic force exerted upon said carriage is dissipated and said carriage is displaced in said first direction in response to the force of said biasing means.

10. The machine tool as set forth in claim 1 including:
  A. a further passageway extending from said pressure chamber to said reservoir; and
  B. valve means disposed within said further passageway for releasing the pressure within said pressure chamber.

11. The machine tool as set forth in claim 10 further including a fitting connected to said pressure chamber for providing a source of hydraulic fluid under pressure to apparatus external to said main body.

* * * * *